(12) United States Patent
Richard et al.

(10) Patent No.: US 12,159,339 B2
(45) Date of Patent: *Dec. 3, 2024

(54) THREE-DIMENSIONAL FACE ANIMATION FROM SPEECH

(71) Applicant: Meta Platforms Technologies, LLC, Menlo Park, CA (US)

(72) Inventors: Alexander Richard, Pittsburgh, PA (US); Michael Zollhoefer, Pittsburgh, PA (US); Fernando De la Torre, Pittsburgh, PA (US); Yaser Sheikh, Pittsburgh, PA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/462,310

(22) Filed: Sep. 6, 2023

(65) Prior Publication Data
US 2023/0419579 A1 Dec. 28, 2023

Related U.S. Application Data

(63) Continuation of application No. 17/669,270, filed on Feb. 10, 2022, now Pat. No. 11,756,250.
(Continued)

(51) Int. Cl.
*G06T 19/00* (2011.01)
*G06T 13/20* (2011.01)
(Continued)

(52) U.S. Cl.
CPC ............ *G06T 13/205* (2013.01); *G06T 13/40* (2013.01); *G06T 17/20* (2013.01); *G06T 19/006* (2013.01);
(Continued)

(58) Field of Classification Search
None
See application file for complete search history.

(56) References Cited

U.S. PATENT DOCUMENTS

2017/0039750 A1 2/2017 Tong et al.
2021/0056348 A1 2/2021 Berlin et al.

OTHER PUBLICATIONS

Brand M., "Voice Puppetry," Proceedings of the 26th Annual Conference on Computer Graphics and Interactive Techniques, 1999, pp. 21-28.
(Continued)

*Primary Examiner* — Nicholas R Wilson
(74) *Attorney, Agent, or Firm* — McDermott Will & Emery LLP

(57) ABSTRACT

A method for training a three-dimensional model face animation model from speech, is provided. The method includes determining a first correlation value for a facial feature based on an audio waveform from a first subject, generating a first mesh for a lower portion of a human face, based on the facial feature and the first correlation value, updating the first correlation value when a difference between the first mesh and a ground truth image of the first subject is greater than a pre-selected threshold, and providing a three-dimensional model of the human face animated by speech to an immersive reality application accessed by a client device based on the difference between the first mesh and the ground truth image of the first subject. A non-transitory, computer-readable medium storing instructions to cause a system to perform the above method, and the system, are also provided.

20 Claims, 13 Drawing Sheets

Related U.S. Application Data

(60) Provisional application No. 63/161,848, filed on Mar. 16, 2021.

(51) Int. Cl.
   *G06T 13/40* (2011.01)
   *G06T 17/20* (2006.01)
   *G10L 21/14* (2013.01)
   *G10L 21/10* (2013.01)

(52) U.S. Cl.
   CPC ........ *G10L 21/14* (2013.01); *G10L 2021/105* (2013.01)

(56) References Cited

OTHER PUBLICATIONS

Bregler C., et al., "Video Rewrite: Driving Visual Speech with Audio," Proceedings of the 24th Annual Conference on Computer Graphics and Interactive Techniques, 1997, 8 pages.

Cudeiro D., et al., "Capture, Learning, and Synthesis of 3D Speaking Styles," In Proceedings of the IEEE/CVF Conference on Computer Vision and Pattern Recognition (CVPR), 2019, pp. 10101-10111.

EPO—International Preliminary Report on Patentability for International Application No. PCT/US2022/020089, mailed Sep. 28, 2023, 7 pages.

EPO—International Search Report and Written Opinion for International Application No. PCT/US2022/020089, mailed Jul. 15, 2022, 8 pages.

Jang E., et al., "Categorical Reparametrization with Gumble-Softmax," International Conference on Learning Representations (ICLR), Aug. 5, 2017, pp. 1-13.

Karras T., et al., "Audio-Driven Facial Animation by Joint End-To-End Learning of Pose and Emotion," ACM Transactions on Graphics (TOG), Jul. 2017, vol. 36, No. 4, pp. 1-12.

Oord A., et al., "Conditional Image Generation with Pixel CNN Decoders," Advances in Neural Information Processing Systems 29 (NIPS), 2016, pp. 1-9.

Richard A., et al., "Audio-and Gaze-Driven Facial Animation of Codec Avatars," In Proceedings of the IEEE/CVF Winter Conference on Applications of Computer Vision (WACV), 2021, pp. 41-50.

Thies J., et al., "Neural Voice Puppetry—Audio-driven Facial Reenactment," arXiv:1912.05566v1, Dec. 11, 2019, 12 pages.

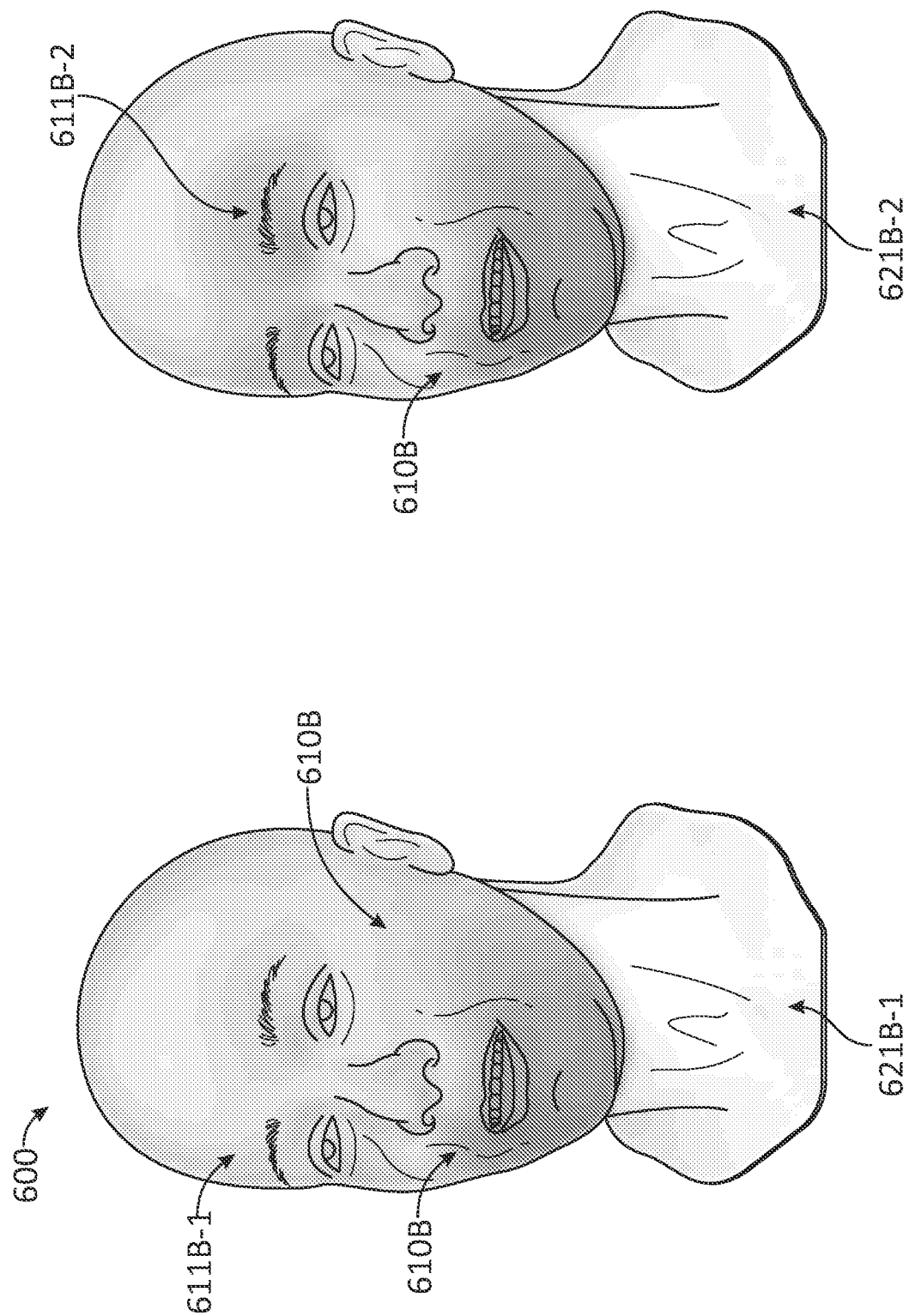

THREE-DIMENSIONAL FACE ANIMATION FROM SPEECH

CROSS-REFERENCE TO RELATED APPLICATIONS

This present application claims the benefit of priority under 35 U.S.C. 120 as a continuation of U.S. patent application Ser. No. 17/669,270, filed Feb. 10, 2022, now allowed, which claims the benefit of U.S. Provisional Application No. 63/161,848, filed on Mar. 16, 2021, the disclosures of which are hereby incorporated by reference in their entirety for all purposes.

BACKGROUND

Field

The present disclosure is related generally to the field of generating three-dimensional computer models of subjects of a video capture. More specifically, the present disclosure is related to generating three-dimensional (3D), full facial animation of a subject from speech, in a video capture.

Related Art

Existing approaches to audio-driven facial animation exhibit uncanny or static up-per face animation, fail to produce accurate and plausible co-articulation, or rely on person-specific models that limit their scalability.

BRIEF DESCRIPTION OF THE DRAWINGS

FIGS. 6A-6B illustrate the impact of audio input and expression input on face meshes, according to some embodiments.

Figure 1:
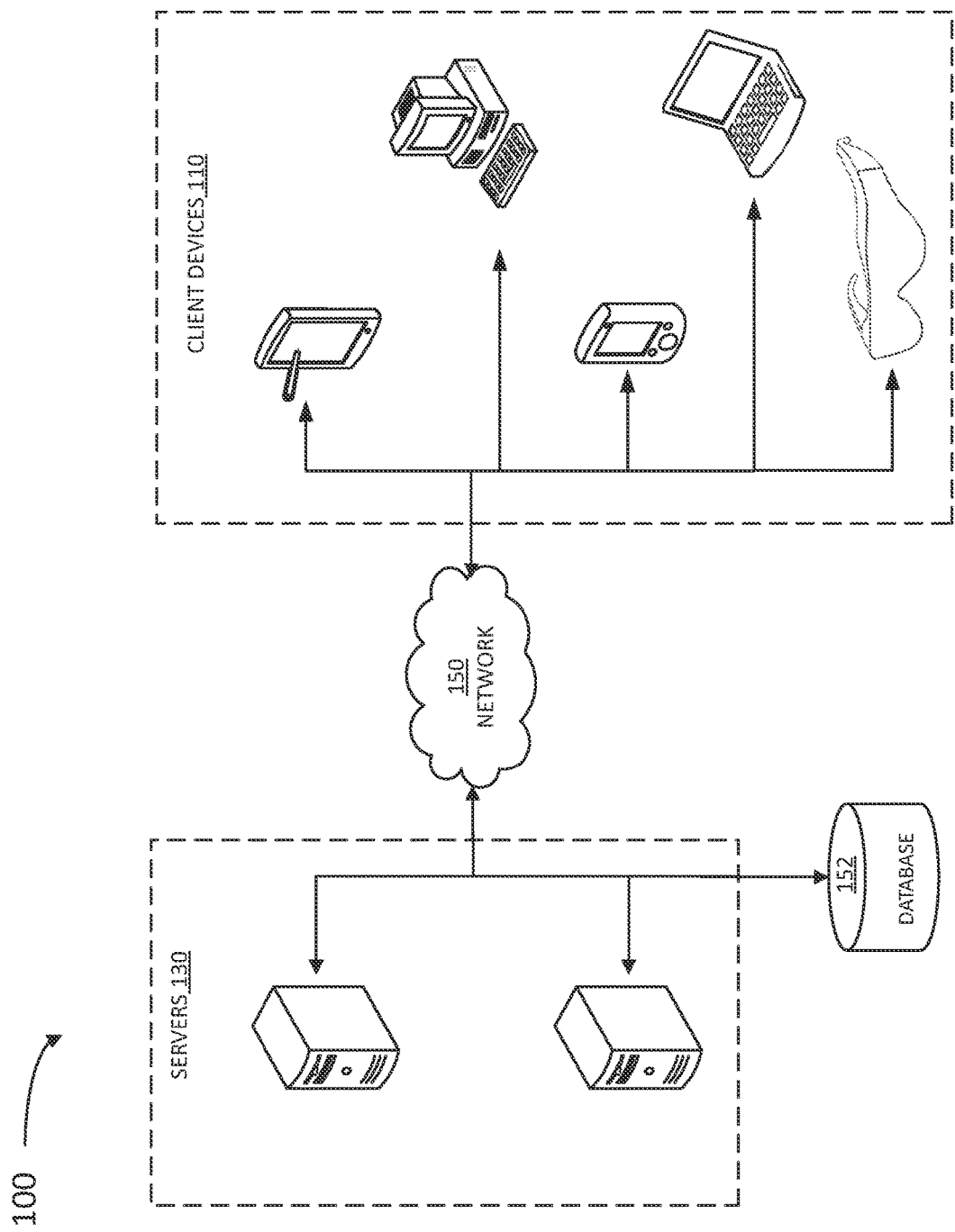
FIG. 1 illustrates an example architecture suitable for providing 3D face animation from speech for immersive reality environments, according to some embodiments.

In the figures, elements referred to with the same or similar labels have the same or similar features and description, unless stated otherwise.

SUMMARY

In a first embodiment, a computer-implemented method includes identifying, from an audio capture of a subject, an audio-correlated facial feature, generating a first mesh for a lower portion of a face of the subject, based on the audio-correlated facial feature, and identifying an expression-like facial feature of the subject. The computer-implemented method also includes generating a second mesh for an upper portion of a face of the subject based on the expression-like facial feature, forming a synthesized mesh with the first mesh and the second mesh, and determining a loss value of the synthesized mesh based on a ground truth image of the subject. The computer-implemented method also includes generating a three-dimensional model of the face of the subject with the synthesized mesh based on the loss value, and providing the three-dimensional model of the face of the subject to a display in a client device running an immersive reality application that includes the subject.

In a second embodiment, a system includes a memory storing multiple instructions and one or more processors configured to execute the instructions to cause the system to perform operations. The operations include to identify, from an audio capture of a subject, an audio-correlated facial feature, to generate a first mesh for a lower portion of a face of the subject, based on the audio-correlated facial feature, and to identify an expression-like facial feature of the subject. The operations also include to generate a second mesh for an upper portion of a face of the subject based on the expression-like facial feature, to form a synthesized mesh with the first mesh and the second mesh, and to determine a loss value of the synthesized mesh based on a ground truth image of the subject. The operations also include to generate a three-dimensional model of the face of the subject with the synthesized mesh based on the loss value, and to provide the three-dimensional model of the face of the subject to a display in a client device running an immersive reality application that includes the subject.

In a third embodiment, a computer-implemented method includes determining a first correlation value for a facial feature based on an audio waveform from a first subject, generating a first mesh for a lower portion of a human face, based on the facial feature and the first correlation value, updating the first correlation value based on a difference between the first mesh and a ground truth image of the first subject, and providing a three-dimensional model of the human face animated by speech to an immersive reality application accessed by a client device based on the difference between the first mesh and the ground truth image of the first subject.

In another embodiment, a non-transitory, computer-readable medium stores instructions which, when executed by a processor, cause a computer to perform a method. The method includes identifying, from an audio capture of a subject, an audio-correlated facial feature, generating a first mesh for a lower portion of a face of the subject, based on the audio-correlated facial feature, and identifying an expression-like facial feature of the subject. The method also includes generating a second mesh for an upper portion of a face of the subject based on the expression-like facial feature, forming a synthesized mesh with the first mesh and the second mesh, and determining a loss value of the synthesized mesh based on a ground truth image of the subject. The method also includes generating a three-dimensional model of the face of the subject with the synthesized mesh based on the loss value, and providing the three-dimensional model of the face of the subject to a display in a client device running an immersive reality application that includes the subject.

In yet other embodiment, a system includes a means for storing instructions and a means to execute the instructions to perform a method, the method includes identifying, from an audio capture of a subject, an audio-correlated facial feature, generating a first mesh for a lower portion of a face of the subject, based on the audio-correlated facial feature, and identifying an expression-like facial feature of the subject. The method also includes generating a second mesh for an upper portion of a face of the subject based on the expression-like facial feature, forming a synthesized mesh with the first mesh and the second mesh, and determining a loss value of the synthesized mesh based on a ground truth image of the subject. The method also includes generating a three-dimensional model of the face of the subject with the synthesized mesh based on the loss value, and providing the three-dimensional model of the face of the subject to a display in a client device running an immersive reality application that includes the subject.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

Speech-driven facial animation is a challenging technical problem with several applications such as facial animation for computer games, e-commerce, immersive virtual reality (VR) telepresence, and other augmented reality (AR) applications. The demands on speech-driven facial animation differ depending on the application. Applications such as speech therapy or entertainment (e.g., Animoji's or AR effects) may use lower precision/realism in the animation. In the production of films, movie dubbing, driven virtual avatars for e-commerce applications or immersive telepresence, on the contrary, the quality of speech animation demands a high degree of naturalness, plausibility, and has to provide intelligibility comparable to a natural speaker. The human visual system has been evolutionary adapted to understanding subtle facial motions and expressions. Thus, a poorly animated face without realistic co-articulation effects or out of lip-sync is deemed to be disturbing for the user, and deleterious for the commercial success of the device or application.

There is an important degree of dependency between speech and facial gestures. This dependency has been exploited by audio-driven facial animation methods developed in computer vision and graphics. With the advances in deep learning techniques, some audio-driven face animation techniques make use of person-specific approaches trained in a supervised fashion, based on a large corpus of paired audio and mesh data. Some of these approaches obtain high-quality lip animation and synthesize plausible upper face motion from audio alone. However, to obtain the required training data, high-quality vision-based motion capture of the user is required, which renders these approaches highly impractical for consumer-facing applications in real-world settings. Some approaches include generalizations or averages across different identities and is thus able to animate arbitrary users based on a given audio stream and a static neutral 3D scan of the user. While such approaches are practical in real-world settings, they normally exhibit uncanny or static upper face animation because audio does not encode all aspects of the facial expressions. Thus, typical audio-driven facial animation models available try to learn a one-to-many mapping, i.e., there are multiple plausible outputs for every input. This often leads to over-smoothed results (e.g., uncanny, unusual, or clearly artificial), especially in the regions of the face that are only weakly or even un-correlated to the audio signal.

To address these technical problems arising in the field of computer networks, computer simulations and immersive reality applications, embodiments as disclosed herein include technical aspects such as an audio-driven facial animation approach that enables highly realistic motion synthesis for the entire face and also generalizes to unseen identities. Accordingly, a machine learning application includes a categorical latent space of facial animation that disentangles audio-correlated and audio-uncorrelated information. For example, eye closure may not be bound to a specific lip shape. The latent space is trained based on a novel cross-modality loss that encourages the model to have an accurate upper face reconstruction independent of the audio input and accurate mouth area that only depends on the provided audio input. This disentangles the motion of the lower and upper face region and prevents over-smoothed results. Motion synthesis is based on an autoregressive sampling strategy of the audio-conditioned temporal model over the learnt categorical latent space. Our approach ensures highly accurate lip motion, while also being able to sample plausible animations of parts of the face that are uncorrelated to the audio signal, such as eye blinks and eyebrow motion.

It is desirable to animate an arbitrary neutral face mesh using only speech, as this is faster to process (e.g., less than 1 second of an audio waveform may suffice). Because speech does not encode all aspects of the facial expressions, e.g., eye-blinks and the like, there are many speech-uncorrelated expressive features in the human face. This results in most existing audio-driven approaches exhibiting uncanny or static upper face animation. To overcome this technical problem, embodiments as disclosed herein include a categorical latent space for facial expressions stored in a training database. At inference time, some embodiments perform autoregressive sampling from a speech-conditioned temporal model over the categorical latent space that ensures accurate lip motion while synthesizing plausible animation of face parts that are uncorrelated to speech. The categorical latent space may include the following features. 1) Categorical: the space is segmented by learned categories. 2) Expressive: the latent space may be capable of encoding diverse facial expressions, including sparse facial events like eye blinks. And 3) Semantically disentangled: speech-correlated and speech-uncorrelated information may desirably be, at least partially, disentangled, e.g., eye closure should not be bound to a given lip shape or mouth posture.

Additionally, embodiments as disclosed herein include re-targeting configurations where a 3D speech animation model trained on one or more subjects is seamlessly applied to a different subject. In some embodiments, a 3D speech animation model as disclosed herein may be used for dubbing the speech from a given subject to a multilingual speech from one or more different subjects.

Example System Architecture

FIG. 1 illustrates an example architecture 100 suitable for accessing a 3D speech animation engine, according to some embodiments. Architecture 100 includes servers 130 communicatively coupled with client devices 110 and at least one database 152 over a network 150. One of the many servers 130 is configured to host a memory including instructions which, when executed by a processor, cause the server 130 to perform at least some of the steps in methods as disclosed herein. In some embodiments, the processor is configured to control a graphical user interface (GUI) for the user of one of client devices 110 accessing the 3D speech animation engine. The 3D speech animation engine may be configured to train a machine learning model for performing a specific application. Accordingly, the processor may include a dashboard tool, configured to display components and graphic results to the user via the GUI. For purposes of load balancing, multiple servers 130 can host memories including instructions to one or more processors, and multiple servers 130 can host a history log and a database 152 including multiple training archives used for the 3D speech animation engine. Moreover, in some embodiments, multiple users of client devices 110 may access the same 3D speech animation engine to run one or more machine learning models. In some embodiments, a single user with a single client device 110 may train multiple machine learning models running in parallel in one or more servers 130. Accordingly, client devices 110 may communicate with each other via network 150 and through access to one or more servers 130 and resources located therein. In some embodiments, at least one or more client devices 110 may include a headset for virtual reality (VR) applications, or a smart glass for augmented reality (AR) applications, as disclosed herein. In that regard, the headset or smart glass may be paired to a smart phone for wireless communication with an AR/VR application installed in the smart phone, and from the smart phone, the headset or smart glass may communicate with server 130 via network 150.

Servers 130 may include any device having an appropriate processor, memory, and communications capability for hosting the 3D speech animation engine including multiple tools associated with it. The 3D speech animation engine may be accessible by various clients 110 over network 150. Clients 110 can be, for example, desktop computers, mobile computers, tablet computers (e.g., including e-book readers), mobile devices (e.g., a smartphone or PDA), or any other device having appropriate processor, memory, and communications capabilities for accessing the 3D speech animation engine on one or more of servers 130. Network 150 can include, for example, any one or more of a local area tool (LAN), a wide area tool (WAN), the Internet, and the like. Further, network 150 can include, but is not limited to, any one or more of the following tool topologies, including a bus network, a star network, a ring network, a mesh network, a star-bus network, tree or hierarchical network, and the like.

Figure 2:
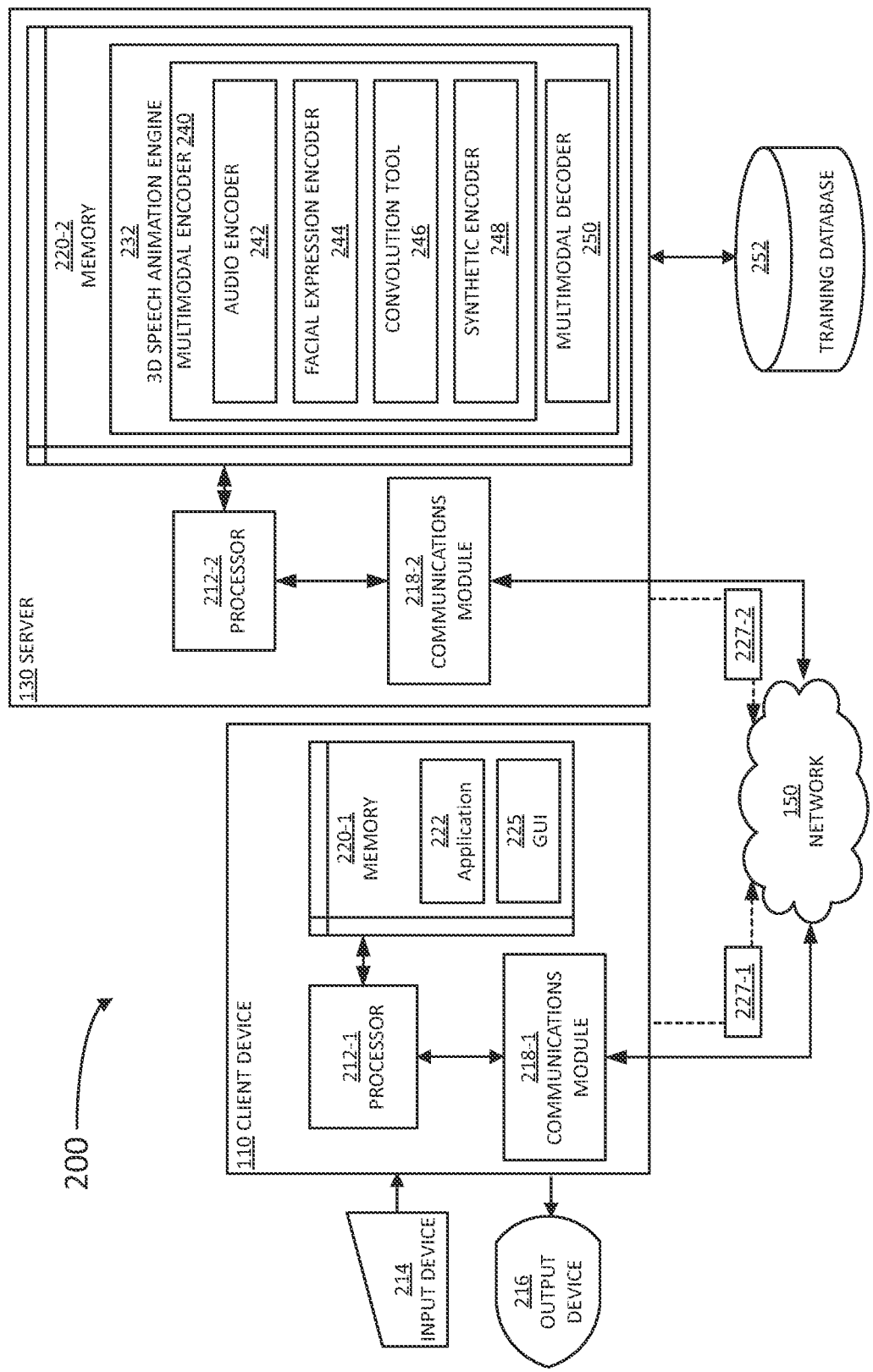
FIG. 2 is a block diagram illustrating an example server and client from the architecture of FIG. 1, according to certain aspects of the disclosure.

FIG. 2 is a block diagram 200 illustrating an example server 130 and client device 110 from architecture 100, according to certain aspects of the disclosure. Client device 110 and server 130 are communicatively coupled over network 150 via respective communications modules 218-1 and 218-2 (hereinafter, collectively referred to as "communications modules 218"). Communications modules 218 are configured to interface with network 150 to send and receive information, such as data, requests, responses, and commands to other devices via network 150. Communications modules 218 can be, for example, modems or Ethernet cards. A user may interact with client device 110 via an input device 214 and an output device 216. Input device 214 may include a mouse, a keyboard, a pointer, a touchscreen, a microphone, a joystick, a wireless joystick, and the like. Output device 216 may be a screen display, a touchscreen, a speaker, and the like. Client device 110 may include a memory 220-1 and a processor 212-1. Memory 220-1 may include an application 222 and a GUI 225, configured to run in client device 110 and to couple with input device 214 and output device 216. Application 222 may be downloaded by the user from server 130, and may be hosted by server 130. In some embodiments, client device 110 may include a headset or a smart glass, and application 222 may include an immersive reality environment in an AR/VR application, as disclosed herein. In the process of running application 222, client device 110 and server 130 may transmit data packets 227-1 and 227-2 between each other, via communication modules 218 and network 150. For example, client device 110 may provide a data packet 227-1 to server 130 including a speech signal or sound file from the user. Accordingly, server 130 may provide to client device 110 a data packet 227-2 including a 3D animated model of the user based on the speech signal or sound file from the user.

Server 130 includes a memory 220-2, a processor 212-2, and communications module 218-2. Hereinafter, processors 212-1 and 212-2, and memories 220-1 and 220-2, will be collectively referred to, respectively, as "processors 212" and "memories 220." Processors 212 are configured to execute instructions stored in memories 220. In some embodiments, memory 220-2 includes a 3D speech animation engine 232. 3D speech animation engine 232 may share or provide features and resources to GUI 225, including multiple tools associated with training and using a 3D model animation of a human face for immersive reality applications including speech. The user may access 3D speech animation engine 232 through application 222 installed in a memory 220-1 of client device 110. Accordingly, application 222 may be installed by server 130 and perform scripts and other routines provided by server 130 through any one of multiple tools. Execution of application 222 may be controlled by processor 212-1.

In that regard, 3D speech animation engine 232 may be configured to create, store, update, and maintain a multimodal encoder 240, as disclosed herein. Multimodal encoder 240 may include an audio encoder 242, a facial expression encoder 244, a convolution tool 246, and a synthetic encoder 248. 3D speech animation engine 232 may also include a synthetic decoder 248. In some embodiments, 3D speech animation engine 232 may access one or more machine learning models stored in a training database 252. Training database 252 includes training archives and other data files that may be used by 3D speech animation engine 232 in the training of a machine learning model, according to the input of the user through application 222. Moreover, in some embodiments, at least one or more training archives or machine learning models may be stored in either one of memories 220. The user of client device 110 may have access to training archives through application 222.

Audio encoder 242 identifies audio-correlated facial features to generate a first mesh for a lower portion of a face of a subject, according to a classification scheme that is learned by training. To do this, audio encoder 242 is able to identify an intensity and a frequency of an acoustic waveform, or a portion thereof, in an audio capture from a subject. The audio capture may include part of a speech from the subject, captured in real time by an AR/VR application (e.g., application 222), or collected during a training session and stored in training database 252. Audio encoder 242 may also correlate the intensity and frequency of the acoustic waveform with a geometry of a lower portion of the subject's face (e.g., mouth and lips, and portions of the chin and cheeks). Facial expression encoder 244 identifies an expression-like facial feature of the subject to generate a second mesh for an upper portion of the face of the subject. Accordingly, facial expression encoder 244 may stochastically select the expression-like facial feature based on a prior sampling of multiple subject's facial expressions. In that regard, multiple subject facial expressions collected during a training session of a second subject reading a text or in conversation may be stored in training database 252 and accessed by facial expression encoder 244. In some embodiments, facial expression encoder 244 correlates an upper facial feature with a speech feature from the audio capture of the subject.

Convolution tool 246 may be part of a convolutional neural network (CNN) configured to reduce the dimensionality of multiple neural network layers in a 3D animation model. In some embodiments, convolution tool 246 provides a temporal convolution for a 3D animation of the subject's face, according to speech (e.g., a tCNN). In some embodiments, convolution tool 246 provides an autoregression convolution where labels generated in further layers of a neural network are fed back to previous layers to improve a category scan in a CNN. Synthetic decoder 248 generates a synthetic mesh of the full face of the subject with the first mesh provided by audio encoder 242 and the second mesh provided by facial expression encoder 244. Accordingly, synthetic decoder 248 merges continuously and seamlessly a lip shape in the first mesh provided by audio encoder 242 into an eye closure in the second mesh provided by facial expression encoder 244, across the face of the subject. In some embodiments, synthetic decoder 248 may include additive skip connections to handle limited computational capacity using the inductive bias of a CNN.

3D speech animation engine 232 also includes a multimodal decoder 250 configured to generate a three-dimensional model of the face of the subject with the synthesized mesh, and to provide the three-dimensional model of the face of the subject to a display in client device 110 running application 222 (e.g., an immersive reality application that includes the subject).

3D speech animation engine 232 may include algorithms trained for the specific purposes of the engines and tools included therein. The algorithms may include machine learning or artificial intelligence algorithms making use of any linear or non-linear algorithm, such as a neural network algorithm, or multivariate regression algorithm. In some embodiments, the machine learning model may include a neural network (NN), a convolutional neural network (CNN), a generative adversarial neural network (GAN), a deep reinforcement learning (DRL) algorithm, a deep recurrent neural network (DRNN), a classic machine learning algorithm such as random forest, k-nearest neighbor (KNN) algorithm, k-means clustering algorithms, or any combination thereof. More generally, the machine learning model may include any machine learning model involving a training step and an optimization step. In some embodiments, training database 252 may include a training archive to modify coefficients according to a desired outcome of the machine learning model. Accordingly, in some embodiments, 3D speech animation engine 232 is configured to access training database 252 to retrieve documents and archives as inputs for the machine learning model. In some embodiments, 3D speech animation engine 232, the tools contained therein, and at least part of training database 252 may be hosted in a different server that is accessible by server 130.

Figure 3:
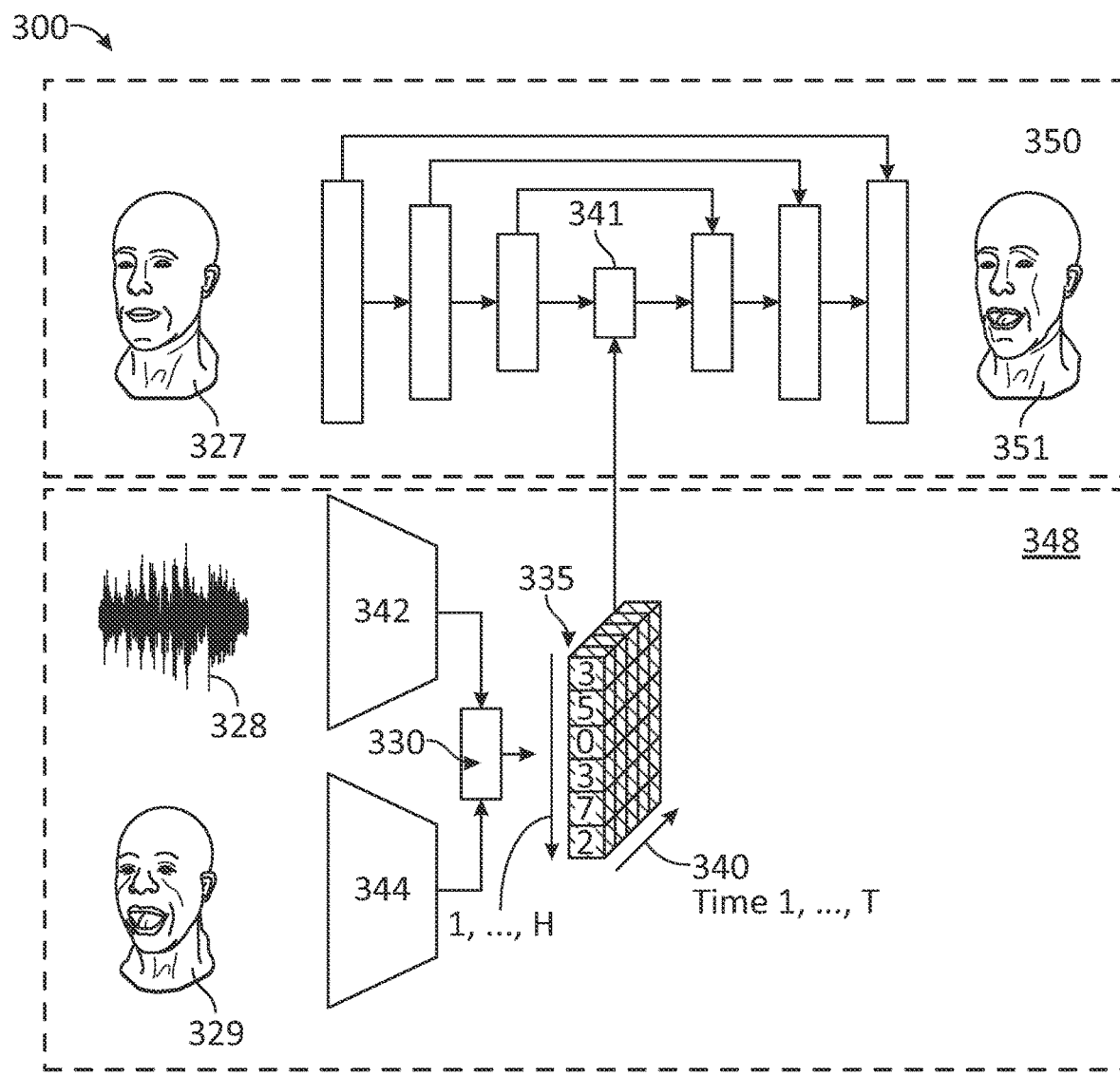
FIG. 3 illustrates a block diagram of a mapping of a face mesh and a speech signal to a categorical face expression space, according to some embodiments.

FIG. 3 illustrates a block diagram of a mapping 300 of a neutral face mesh 327 and a speech signal 328 to an expressive face mesh 351, animated by speech, according to some embodiments. A synthetic encoder 348 includes a fusion block 330 to map a sequence of input animated face meshes 329 (the expression signal) and speech signal 328 to an encoded expression 341 in a categorical latent space 340, via a synthetic encoder 348. A decoder 350 animates neutral face mesh 327 from encoded expression 341.

To achieve high fidelity, in some embodiments, mapping 300 is trained over multiple subjects and available datasets including eye lids, facial hair, or eyebrows, and therefore render high fidelity full-face motion from speech, over arbitrary identities. In some embodiments, an in-house dataset of 250 subjects is used for training, each of which is reading a total of 50 phonetically balanced sentences. Speech signals 328 are captured at 30 frames per second and face meshes (cf neutral face mesh 327 and animated face meshes 329) are tracked from 80 synchronized cameras surrounding the subject's head. In some embodiments, face meshes may include 6, 172 vertices with a high level of detail including eye lids, upper face structure, and different hair styles. In some embodiments, the data amounts to 13 hours of paired audio-visual data, or 1.4 million frames of tracked 3D face meshes. Mapping 300 may be trained on the first 40 sentences of 200 subjects and use the remaining 10 sentences of the remaining 50 subjects as validation (10 subjects) and test set (40 subjects). In some embodiments, a subset of 16 subjects of this dataset may be used as a baseline to compare against the mapping 300. Data is stored in a database (cf. training database 252).

In some embodiments, speech signal 328 is recorded at 16 kHz. For each tracked mesh, a Mel spectrogram is generated, including a 600 ms audio snippet starting 500 ms before and ending 100 ms after the respective visual frame. In some embodiments, speech signal 328 includes 80-dimensional Mel spectral features collected every 10 ms, using 1, 024 frequency bins and a window size of 800 for the underlying Fourier transform.

To train categorical latent space 340, let $x_{1:T}=(x_1, \ldots, x_T)$, $x_t \in R^{V \times 3}$ be a sequence of T face meshes 329, each represented by V vertices. Let further $a_{1:T}=(a_1, \ldots, a_T)$, $a_t \in R^D$ be a sequence of T speech snippets 328, each with D samples, aligned to a corresponding (visual) frame, t. Moreover, template mesh 327 may be denoted as $h \in R^{V \times 3}$.

To achieve high expressiveness, categorical latent space 340 is desirably large. However, this may lead to an infeasibly large number of categories, C, for a single latent categorical layer. Accordingly, some embodiments model a lesser number, H, of latent classification heads 335 of C-way categories. This allows a large expression space with a comparably small number of categories, as the number of configurations of categorical latent space 340 is $C^H$ and therefore grows exponentially in H. In some embodiments, values C=128 and H=64 may be sufficient to obtain accurate results for real-time applications.

The mapping from expression and audio input signals to the multi-head categorical latent space is realized by an encoder $\tilde{\varepsilon}$ (e.g., fusion block 330) which maps from the space of audio sequences 328 and expression sequences 329 to a T×H×C-dimensional encoding, as follows:

$$enC_{1:T,1:H,1:C} = \tilde{\varepsilon}(x_{1:T}, a_{1:T}) \in \mathbb{R}^{T \times H \times C} \quad (1)$$

In some embodiments, the continuous-valued encoding in Eq. 1 is transformed into a categorical representation using a Gumbel-softmax transformation over each latent classification head, $$c_{1:T,1:H} = [\text{Gumbel}(enC_{t,h,1:C})]_{1:T,1:H} \quad (2)$$

such that each categorical component at time step, t, and in the latent classification head, h, gets assigned one of C categorical labels, $c_{t,h} \in \{1, \ldots, C\}$. A complete encoding function, $\tilde{\varepsilon}$ followed by categorization (cf. Eq. 2), may be denoted $\varepsilon$.

The animation of input template mesh 327 ($h$), is realized by decoder 350 (D), as follows:

$$\hat{h}_{1:T} = D(h, c_{1:T,1:H}) \quad (3)$$

which maps encoded expression 341 onto template mesh 327 ($h$). Decoder 350 generates an animated sequence 351 ($\hat{h}_{1:T}$) of face meshes that looks like the person represented by template mesh 327 ($h$), but moves according to the expression code $c_{1:T,1:H}$.

At training time, ground-truth correspondences are available for the case where (a) template mesh 327, speech signal 328, and expression signal 329 are from the same subject, and (b) the desired output from decoder 350 (e.g., animated sequence 351) is equal to the expression input 329 (e.g., $x_{1:T}$, see above). To complete the training, some embodiments include a cross-modality loss function, L, that ensures information from both input modalities (e.g., speech signal 328 and expression signal 329) is utilized in categorical latent space 340. Let $x_{1:T}$ and $a_{1:T}$ be a given expression sequence 329 and speech sequence 328, respectively. Let further $h_x$ denote template mesh 327 for the subject represented in the signal $x_{1:T}$. Instead of a single reconstruction $\hat{h}_{1:T}$, in some embodiments decoder 350 generates two different reconstructions:

$$\hat{h}_{1:T}^{Audio} = D(h_x, \varepsilon(\tilde{x}_{1:T}, a_{1:T})) \quad (4)$$

$$\hat{h}_{1:T}^{Expr} = D(h_x, \varepsilon(x_{1:T}, \tilde{a}_{1:T})) \quad (5)$$

where $\tilde{x}_{1:T}$ and $\tilde{a}_{1:T}$ are a randomly sampled expression and audio sequence from the training database (e.g., training database 252). In some embodiments, $\hat{h}_{1:T}^{Audio}$ is a reconstruction given the correct audio but a random expression sequence, and $\hat{h}_{1:T}^{Expr}$ is a reconstruction given the correct expression sequence but random audio. Accordingly, a cross-modality loss, $L_{xMod}$, may then be defined as:

$$\mathcal{L}_{xMod} = \sum_{t=1}^{T}\sum_{v=1}^{V} M_v^{upper}\left(\left\|\hat{h}_{t:v}^{Expr} - x_{t,v}\right\|^2\right) + \sum_{t=1}^{T}\sum_{v=1}^{V} M_v^{mouth}\left(\left\|\hat{h}_{t:v}^{Audio} - x_{t,v}\right\|^2\right) \quad (6)$$

where $M_v^{upper}$ is a mask that assigns a high weight to vertices, v, on the upper face and a low weight to vertices around the mouth. Similarly, $M_v^{mouth}$ assigns a high weight to vertices, v, around the mouth and a low weight to other vertices.

In some embodiments, cross-modality loss, $L_{xMod}$, encourages the model to have an accurate upper face reconstruction independent of audio input 328 and, accordingly, to have an accurate reconstruction of the mouth area based on audio, independent of expression sequence 329. Since eye blinks are quick and sparse events that affect only a few vertices, some embodiments include a loss, $L_{eyelid}$, that emphasizes eyelid vertices during training, as follows:

$$\mathcal{L}_{eyelid} = \sum_{t=1}^{T}\sum_{v=1}^{V} M_v^{eyelid}\left(\left\|\hat{h}_{t:v} - x_{t,v}\right\|^2\right) \quad (7)$$

where $M_v^{eyelid}$ is a binary mask with ones for eyelid vertices and zeros for other vertices. Accordingly, a final loss function, L, may be optimized as: $L = L_{xMod} + L_{eyelid}$. In some embodiments, an equal weighting of the two terms ($L_{xMod}$ and $L_{eyelid}$) works well in practice. Other embodiments may include different weighting between the $L_{xMod}$ and the $L_{eyelid}$ losses, accordingly.

In some embodiments, audio encoder 342 includes a four-layer, one-dimensional (1D) temporal convolutional network. In some embodiments, expression encoder 344 may include three fully connected layers followed by a single long short-term memory (LSTM) layer to capture temporal dependencies. Fusion block 330 may include a three-layer perceptron. Decoder 350 (D) may include an additive skip connection architecture. This architectural inductive bias prevents the network from diverging from template mesh 327 too much. In the bottleneck layer, the expression code $c_{1:T,1:H}$ is concatenated with encoded expression 341. In some embodiments, the bottleneck layer is followed by two LSTM layers to model temporal dependencies between frames followed by three fully connected layers remapping the representation to vertex space. By including a sequence of audio signals 328 and face meshes 329 in categorical latent space 340, expression input $x_{1:T}$ includes the target signal that would minimize the loss function at the output of decoder 350 (cf. Eqs. 6 and 7). This approach avoids a problem appearing in many multi-modal approaches where a "weaker" modality (e.g., audio, which is typically less data intensive) tends to be ignored.

In some embodiments, training categorical latent space 340 may omit audio signal 328. Limited capacity of categorical latent space 340 and the inductive bias of audio decoder 342 (e.g., skip connections therein), ensures that even in this case, sufficient information is used from the template geometry. In some embodiments, this setup also leads to a low reconstruction error as shown in Table 1. In some embodiments, it is desirable to avoid strong entanglement between eye motion and mouth shape in latent representations for accurate lip shape and to produce temporally consistent and plausible upper face motion at the same time.

TABLE 1

| encoder inputs | decoder loss | reconstruction error (in mm) | autoregr. model perplexity |
|---|---|---|---|
| expression | $\ell 2$ | 1.156 | 1.853 |
| expr. + audio | $\ell 2$ | 1.124 | 1.879 |
| expr. + audio | $\mathcal{L}$xMod | 1.244 | 1.669 |

To quantify this effect ("perplexity"), given a categorical latent representation 340 ($c_{1:T,1:H}$) of a test set data, the perplexity may be calculated as follows:

$$PP = p(c_{1:T,1:H} \mid a_{1:T})^{-\frac{1}{T \cdot H}} \quad (8)$$

Eq. 8 is an inverse geometric average of the likelihood of the latent representations under model 300. Intuitively, a low perplexity means that each prediction step model 300 only has a small number of potential categories, h, to choose from, whereas high perplexity means the model is less certain which categorical representation to choose next. A perplexity of 1 would mean the autoregressive model is fully deterministic, e.g., the latent embedding is fully defined by the conditioning audio input. As there are face motions uncorrelated with audio, this may not happen frequently, in practice. In some embodiments (cf. Table 1, third row), training categorical latent space 340 from audio and expression input leads to a stronger and more confident model 300 than learning the latent space from expression inputs alone.

The training loss of the decoder (Eqs. 6-7) may determine how model 300 makes use of different input modalities (audio/facial expression). Since the expression input (facial expressions 329) is sufficient for exact reconstruction, a simple loss on the desired output meshes will cause model 300 to ignore the audio input and the results are similar to the above case where no audio was given as encoder input (cf. Table 1, rows 1-2). Cross-modality loss, $L_{xMod}$ (Eq. 6), offers an effective solution by encouraging model 300 to learn accurate lip shape even when the expression input is exchanged by different, random expressions. Similarly, upper face motion is encouraged to remain accurate, independent of the audio input. Cross-modality loss does not affect expressiveness of the learnt latent space (cf. Table 1, row 3), e.g., the reconstruction error is small for all latent space variants, and positively affects the autoregressive model's perplexity (cf. Eq. 8).

Figure 4:
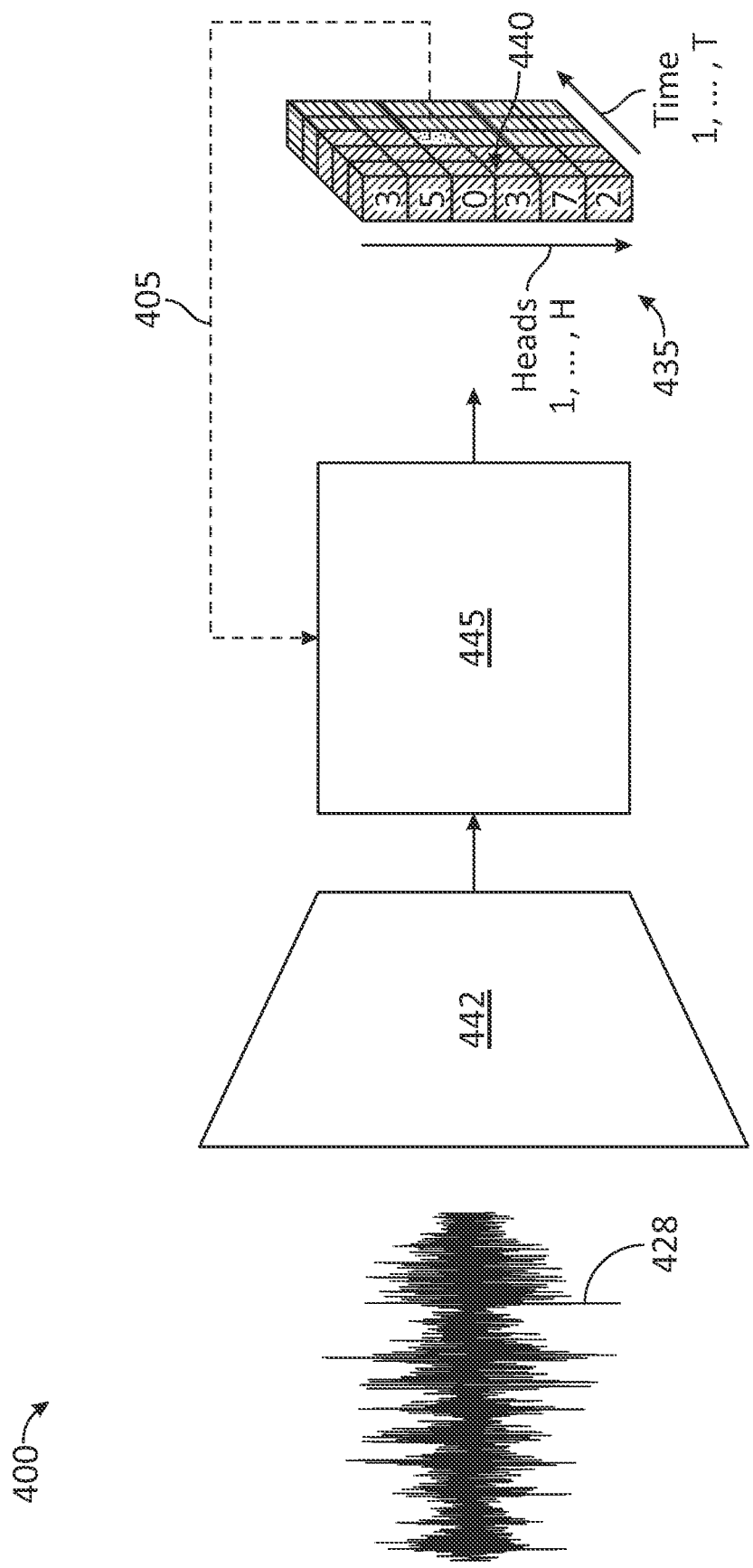
FIG. 4 illustrates a block diagram in an autoregressive model including pre-selected labels, according to some embodiments.

FIG. 4 illustrates a block diagram in an autoregressive model 400 including pre-selected labels 405, according to some embodiments. When driving a template mesh (e.g., mesh 327) using audio input 428 alone, the expression input $x_{1:T}$ is not available. With only one modality given, missing information that is not inferred from audio input 428 is synthesized. Accordingly, some embodiments include autoregressive temporal model 400 over categorical latent space 440. An audio signal 428 is encoded by an audio encoder 442 and a head reader prepares a categorical encoded space 440 scanned by audio-conditioned latent codes 435 along a time direction. Audio-conditioned latent codes 435 are sampled for each position $c_{t,h}$ in categorical latent expression space 440, where autoregressive block 445 has access to pre-selected labels 405.

Autoregressive temporal model 400 allows to sample categorical latent space 440 to generate plausible expressions consistent with audio input 428. According to Bayes' Rule, the probability of a latent embedding $c_{1:T,1:H}$ given the audio input $a_{1:T}$ can be decomposed as $$p(c_{1:T,1:H} \mid a_{1:T}) = \prod_{t=1}^{T} \prod_{v=1}^{V} p(c_{t,h} \mid c_{<t,1:H}, c_{t,<h}, a_{\leq t}) \quad (9)$$

Eq. 9 includes a temporal causality in the decomposition, i.e., a category $c_{t,h}$ at time t only depends on current and past audio information $a \leq t$ rather than on future context $a_{1:T}$. In some embodiments, autoregressive block 445 is a temporal CNN including four convolutional layers with increasing dilation along the temporal axis. In some embodiments, convolutions are masked such that for the prediction of $c_{t,h}$ the model only has access to information from all categorical heads in the past, $c_{<t,1:H}$, and the preceding categorical heads at the current time step, $c_{t,<h}$ (cf. blocks before selected block 405 in timeline). To train autoregressive block 445, audio encoder 442 maps the expression and audio sequences $(x_{1:T}, a_{1:T})$ in the training set to their categorical embeddings (cf. Eq. 1). Autoregressive block 445 is optimized using teacher forcing and a cross-entropy loss over the latent categorical labels. At inference time, a categorical expression code is sequentially sampled for each position $c_{t,h}$ using autoregressive temporal model 400.

Figure 5:
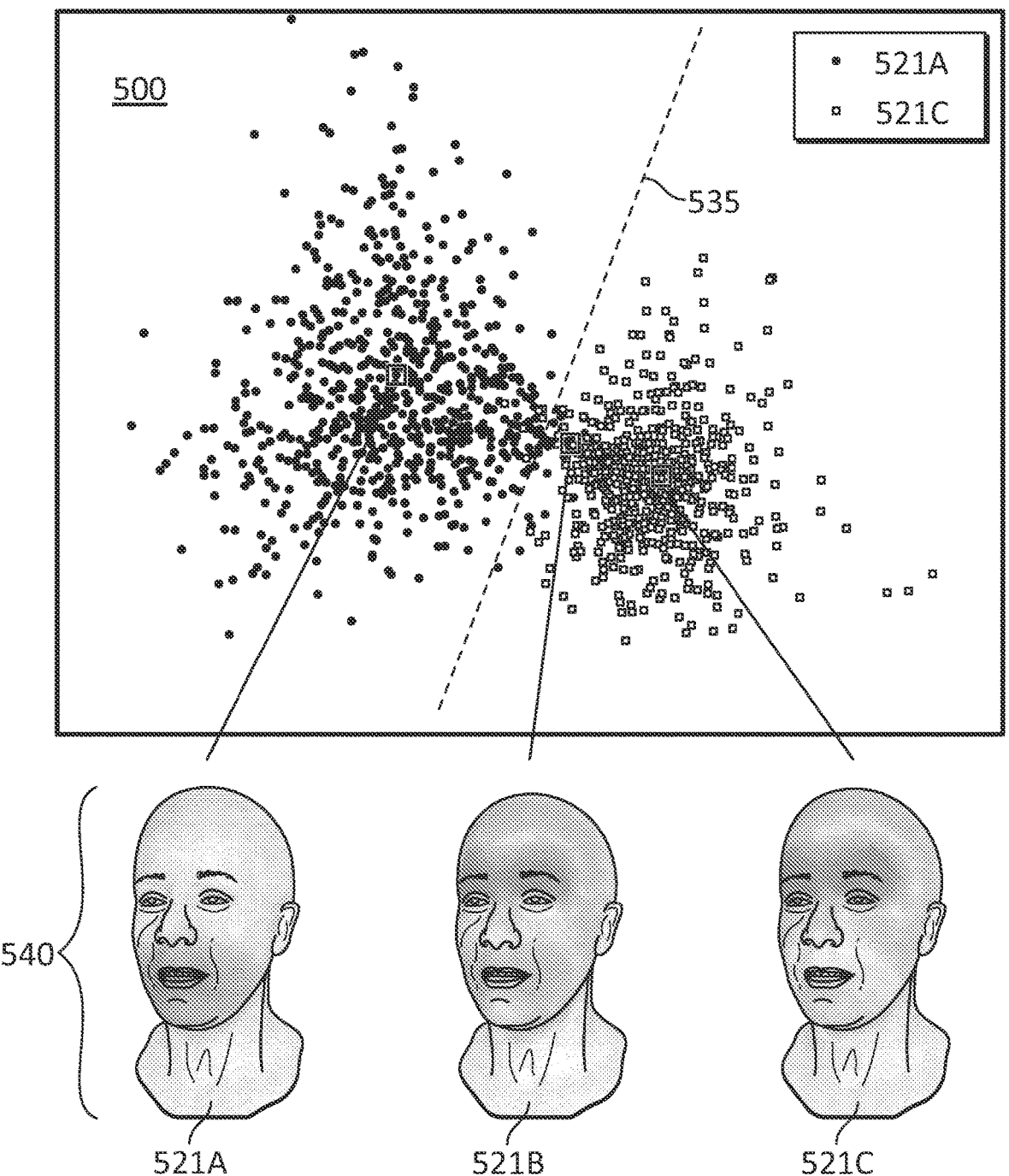
FIG. 5 illustrates a visualization of a latent space clustered according to an expression input, according to some embodiments.

FIG. 5 illustrates a chart 500 of a latent categorical space 540 (e.g., categorical spaces 340 and 440) with classifiers clustered according to expression inputs, according to some embodiments. Chart 500 includes lower face meshes 521A, synthesized meshes 521B, and upper face meshes 521C (hereinafter, collectively referred to as "face meshes 521") in latent categorical space 540. Synthesized meshes 521B successfully merge upper face motion and lip synchronization from different input modalities. In some embodiments, categorical latent space 540 may be preferable over a continuous latent space, to reduce computational complexity. In some embodiments, a continuous latent space may provide higher rendition fidelity.

Cross-modal disentanglement leads to a structured categorical latent space 540 wherein each input modality has different effects on face meshes 521. In some embodiments, model 500 generates two different sets of latent representations, $S_{audio}$ and $S_{expr}$. $S_{audio}$ contains latent codes (lower face meshes 521A) obtained by fixing the expression input to facial expression encoder (e.g., facial expression encoders 244 and 344) and varying the audio signal. Similarly, $S_{expr}$ contains latent codes (upper face meshes 521C) obtained by fixing the audio signal and varying expression input. In the extreme case of perfect cross-modal disentanglement, $S_{audio}$ and $S_{expr}$ form two non-overlapping clusters 521A and 521C. A separating hyper-plane 535 fit on the points in $S_{audio} \cup S_{expr}$ helps visualize a 2D projection of the result. Note that there is only minimal leakage between the clusters formed by $S_{audio}$ and $S_{expr}$.

Figure 6A:
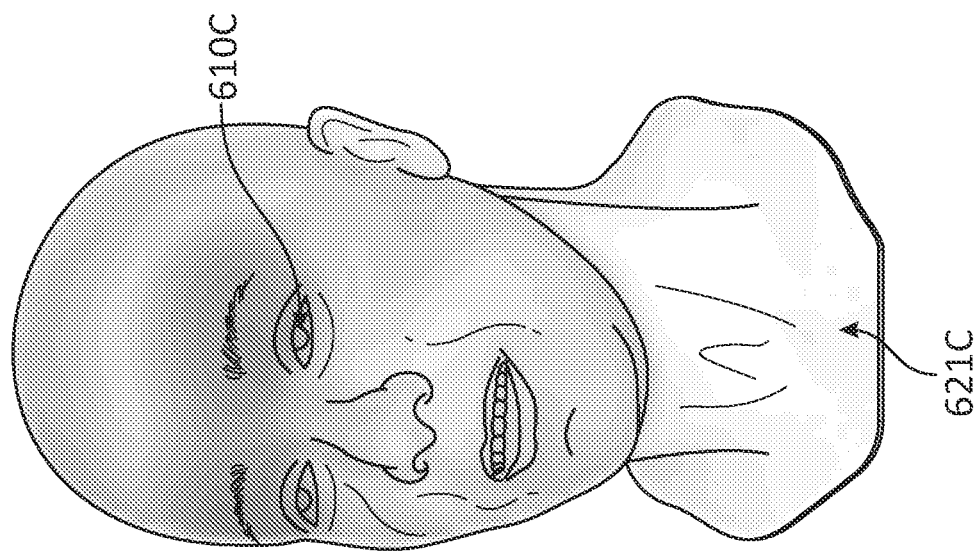
Figure 6A:
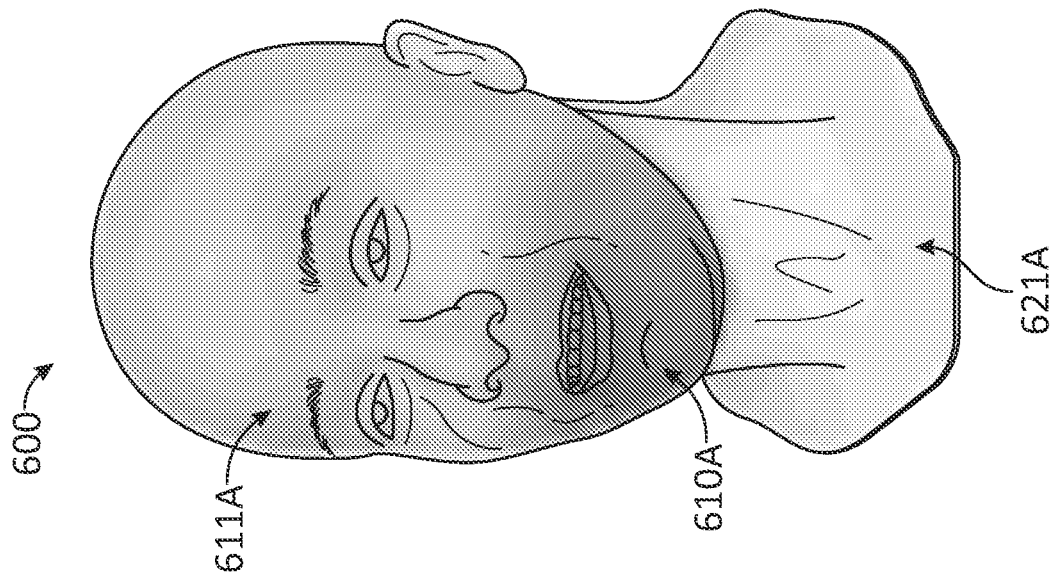

FIGS. 6A-6B illustrate model results 600 showing the impact of audio input and expression input on lower face mesh 621A, upper face mesh 621C, and synthesized meshes 621B-1 (continuous) and 621B-2 (categorical), hereinafter, collectively referred to as "face meshes 621" and "synthesized meshes 621B," according to some embodiments. Face meshes 621 include lower face vertices 610A, upper face vertices 610C, and transition vertices 610B (hereinafter, collectively referred to as "vertices 610"). Face meshes 621 indicate which face vertices are most moved by latent representations within the cluster of $S_{audio}$ (e.g., lower face vertices 610A), within the cluster of S expr (e.g., upper face vertices 610C), and close to the decision boundary (e.g., transition vertices 610B). While audio mostly controls the mouth area (e.g., lower face mesh 621A) and expression controls upper face mesh 621C, latent representations close to the decision boundaries influence face vertices in all areas (vertices 610B), which reflects the intuitive notion that certain upper face expressions are correlated to speech, e.g., raising the eyebrows. For example, in some embodiments, the loss $L_{xMod}$ (cf. Eq. 6) leads to a clear cross-modality disentanglement into upper and lower face motion. Yet, it is notable that audio, besides its impact on lips and jaw, has a considerable impact on the eyebrow area (cf. vertices 611A).

FIG. 6B illustrates the variance of vertices 610B of synthesized face meshes 621B. Note how upper face motion collapses towards mean expressions for the continuous space 621B-1 (only little vertex motion, cf. vertices 611B-1), whereas the categorical space 621B-2 allows to sample rich and diverse upper face motion (cf. vertices 611B-2).

To maintain the stochastic property for the continuous space (cf. mesh 621B-1), the model predicts a mean and variance for each frame from which a representation is then sampled. At inference time, an auto-regressive model, for example, predicts mean and variance from audio input and all past latent representations. The next embedding is then sampled from these mean and variance predictions. In some embodiments, lip error and overall vertex error is larger for continuous space meshes 621B-1 than for the categorical latent space (cf. Table 2).

TABLE 2

| latent space | vertex error (mm) | lip error (mm) |
| --- | --- | --- |
| continuous | 1.975 | 4.578 |
| categorical | 1.244 | 3.184 |

To evaluate the quality of the generated lip synchronization achieved by embodiments as disclosed herein, the lip error of a single frame may be the maximal error of lip vertices and report the average overall frames in a test set. Because upper lip and mouth corners move much less than the lower lip, average overall lip vertex error tends to mask inaccurate lip shapes, while a maximal lip vertex error per frame correlates better with the perceptual quality. Table 3 illustrates lip vertex errors for different models as disclosed herein, including voice-operated character animation (VOCA), a variant where Deep-Speech features include Mel spectrograms, and models as disclosed herein (e.g., model 300 and autoregression convolutional model 400). Table 3 shows that auto-regression convolutional models achieves a lower lip error per frame on average.

TABLE 3

| | lip vertex error (in mm) |
| --- | --- |
| VOCA | 3.720 |
| VOCA + audio encoder | 3.472 |
| Ours | 3.184 |

The quality of models as disclosed herein is fairly independent on the chosen conditioning identity. Table 4 compares perceptual evaluation results from different models, as disclosed herein, wherein tracked ground truth are judged by a total of 100 participants upon three sub-tasks: a full face comparison, a lip sync comparison, where only the region between the chin and the nose is used, and an upper face comparison, where the face from the nose upwards is used. For each row, 400 pairs of short clips each containing one sentence spoken by a subject from the test set are evaluated. Participants could choose to either favor one clip over the other or rank them both as equally good.

TABLE 4

| | favorability | | | ours better or equal |
| --- | --- | --- | --- | --- |
| | competitor | equal | ours | |
| ours vs. VOCA | | | | |
| full-face | 24.7% | 20.9% | 54.4% | 75.3% |
| lip sync | 23.0% | 19.8% | 57.2% | 77.0% |
| upper face | 33.6% | 21.6% | 44.8% | 66.4% |

TABLE 4-continued

| | favorability | | | ours better or equal |
| --- | --- | --- | --- | --- |
| | competitor | equal | ours | |
| ours vs. ground truth | | | | |
| full-face | 42.1% | 35.7% | 22.2% | 57.9% |
| lip sync | 15.1% | 34.1% | 20.8% | 54.9% |
| upper face | 68.5% | 6.9% | 24.6% | 31.5% |

Figure 7:
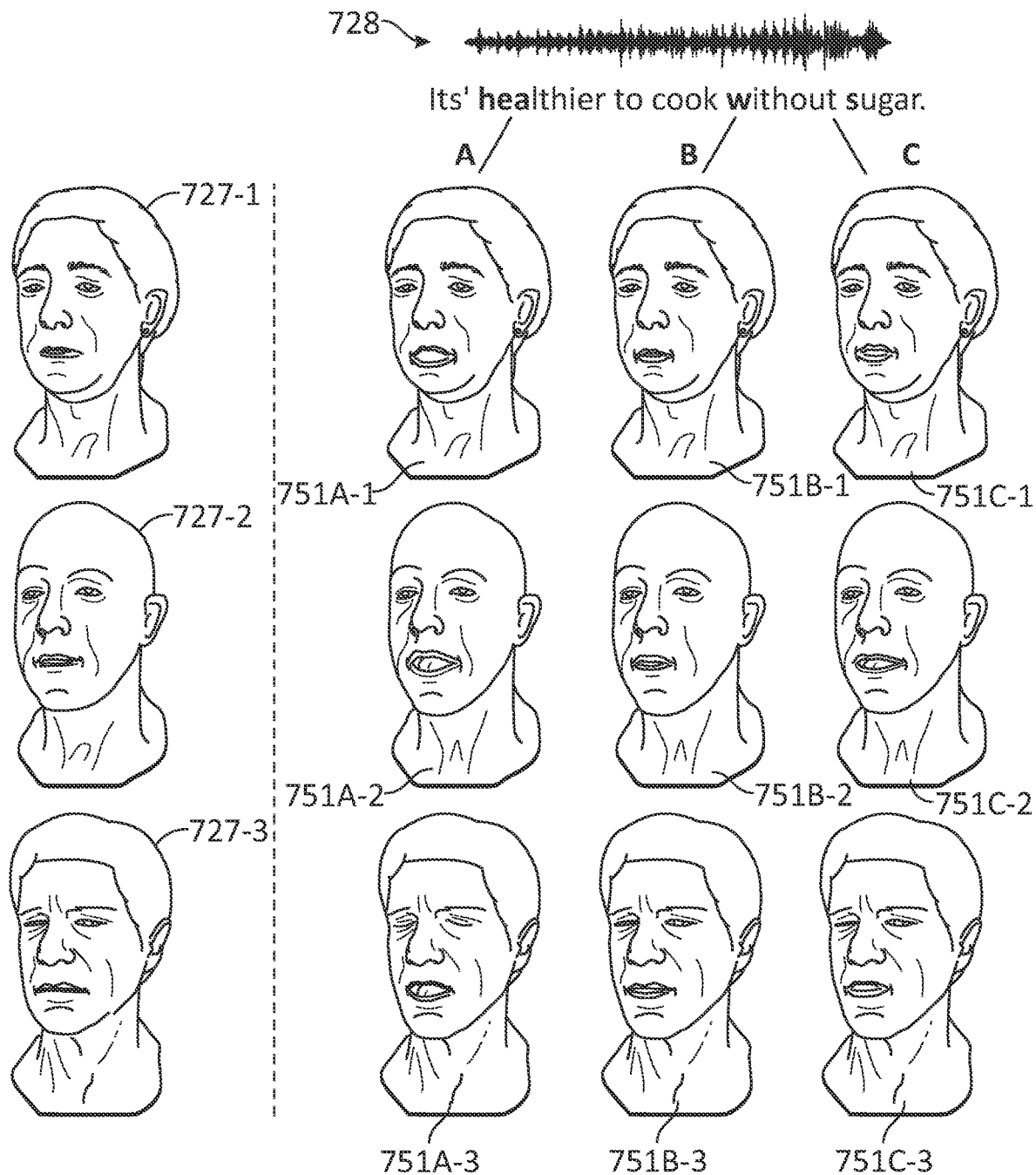
FIG. 7 illustrates different facial expressions for different identities under the same verbal expression, according to some embodiments.

FIG. 7 illustrates different facial expressions for different subjects 727-1, 727-2, and 727-3 (hereinafter, collectively referred to as "subjects 727") under the same verbal expression 728, according to some embodiments. Verbal expression 728 is a sentence in English including three speech portions (A, B, C). Accordingly, a 3D speech animation engine as disclosed herein generates facial animations 751A-1, 751B-1, and 751C-1 for subject 727-1 and speech portions A, B and C, respectively; facial animations 751A-2, 751B-2, and 751C-2 for subject 727-2; and facial animations 751A-3, 751B-3, and 751C-3 for subject 727-3 (hereinafter, collectively referred to as "facial animations 751").

The lip shapes are consistent with the respective speech portions A, B, and C among subjects 727. Further, unique and diverse upper face motion such as eyebrow raises and eye blinks are generated separately for each sequence, e.g., sequence 751A-1, 751A-2, 751A-3 ("sequence 751A"); sequence 751B-1, 751B-2, 751B-3 ("sequence 751B"); and sequence 751C-1, 751C-2, 751C-3 ("sequence 751C").

Figure 8:
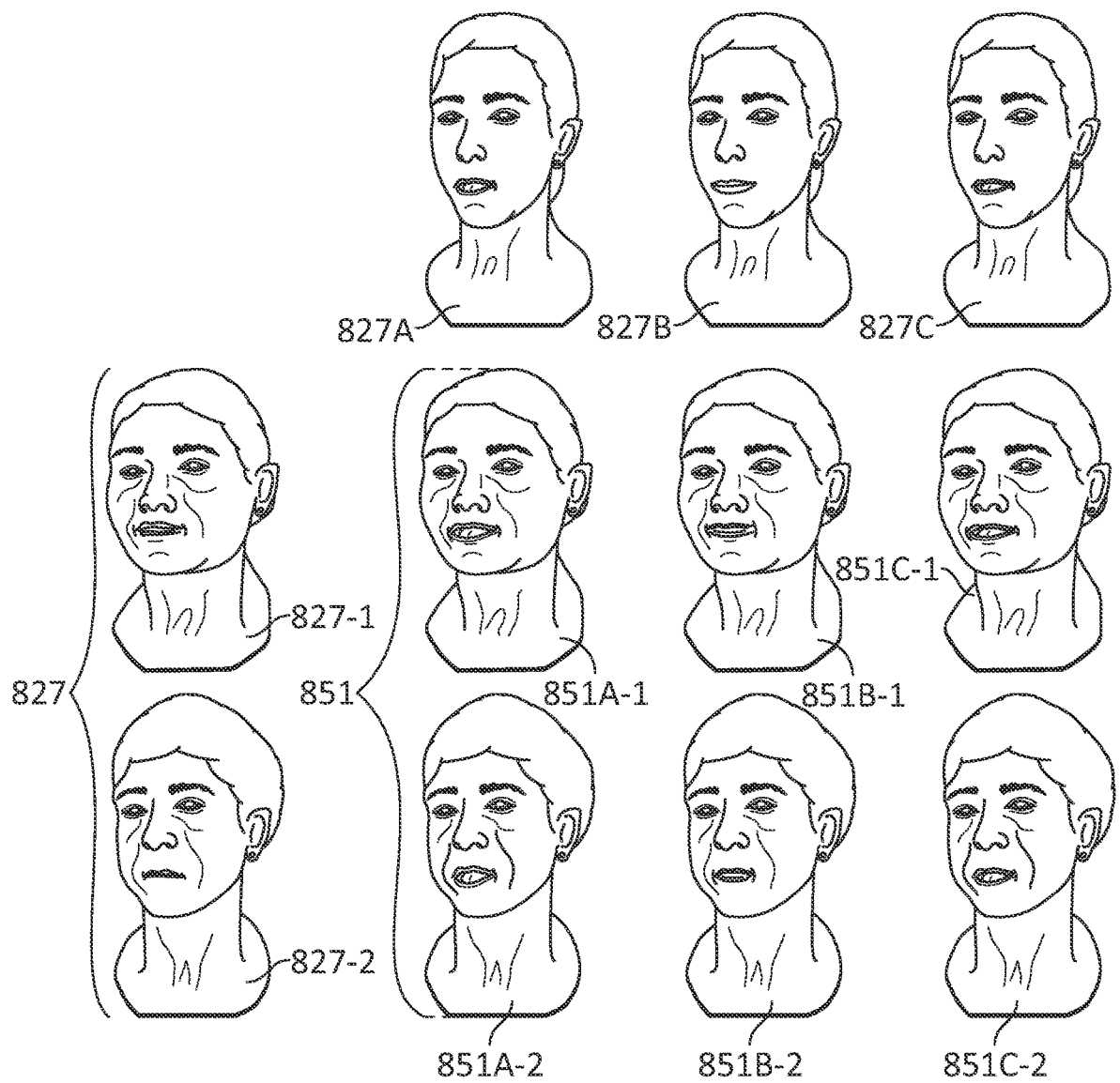
FIG. 8 illustrates a re-targeting of facial expressions such as lip shape, eye closure, and eyebrow level from neutral expressions of different identities, according to some embodiments.

FIG. 8 illustrates a re-targeting of facial animations 851A-1, 851B-1, and 851C-1 for a subject 827-1 (hereinafter, collectively referred to as "facial animations 851-1"), and facial animations 851A-2, 851B-2, and 851C-2 for subject 827-2 (hereinafter, collectively referred to as "facial animations 851-2," and altogether "facial animations 851" for subjects 827), according to some embodiments. Re-targeting is the process of mapping facial motion from one identity's face onto another identity's face. Typical applications are movies or computer games, where an actor animates a face that is not his own.

Facial animations 851 are obtained by a 3D speech animation engine as disclosed herein (cf. model 300) from speech portions derived from different subjects 827A, 827B, and 827C, respectively. It is seen that facial animations 851 maintain common features for the different subjects, such as lip shape, eye closure, and eyebrow level from neutral expressions.

The template mesh used in the model is of the target subject 827. The 3D speech animation engine synthesizes the audio and original animated face mesh to a categorical latent code and decodes it to facial animations 851. In some embodiments, facial animations 851 may be obtained without an autoregressive model (e.g., autoregressive model 400).

Figure 9:
FIG. 9 illustrates adjustments in facial expression based on an audio language (English/Spanish), according to some embodiments.

FIG. 9 illustrates adjustments ("mesh dubbing") in facial expressions 951A-1, 951B-1, 951C-1, 951D-1, 951E-1 (hereinafter, collectively referred as "English facial expressions 951-1"); and 951A-2, 951B-2, 951C-2, 951D-2, 951E-2 (hereinafter, collectively referred as "Spanish facial expressions 951-2") based on an audio input 927-1—English—and 927-2—Spanish—(hereinafter, collectively referred as "multilingual audio inputs 927"), according to some embodiments.

In some embodiments, a 3D speech animation engine as disclosed herein (cf. 3D speech animation engine 232) may be applied to dubbing videos for speech translation into multilingual audio inputs 927 that is fully consistent with the lip motion in the original language. Facial expressions 951-1 and 951-2 (hereinafter, collectively referred to as "facial expressions 951") have matching lip motion in multilingual audio inputs 927, while keeping upper face motion intact. Accordingly, the 3D speech animation engine re-synthesizes lip motion in the new language 927-2. Because the categorical latent space is disentangled across modalities (cf. meshes 521 and 621), lip motion is adapted to audio snippet 927-2 but the general upper face motion such as eye blinks are maintained from the original clip (cf. lower face meshes 521A and 621A with upper face meshes 521C and 621C).

Figure 10:
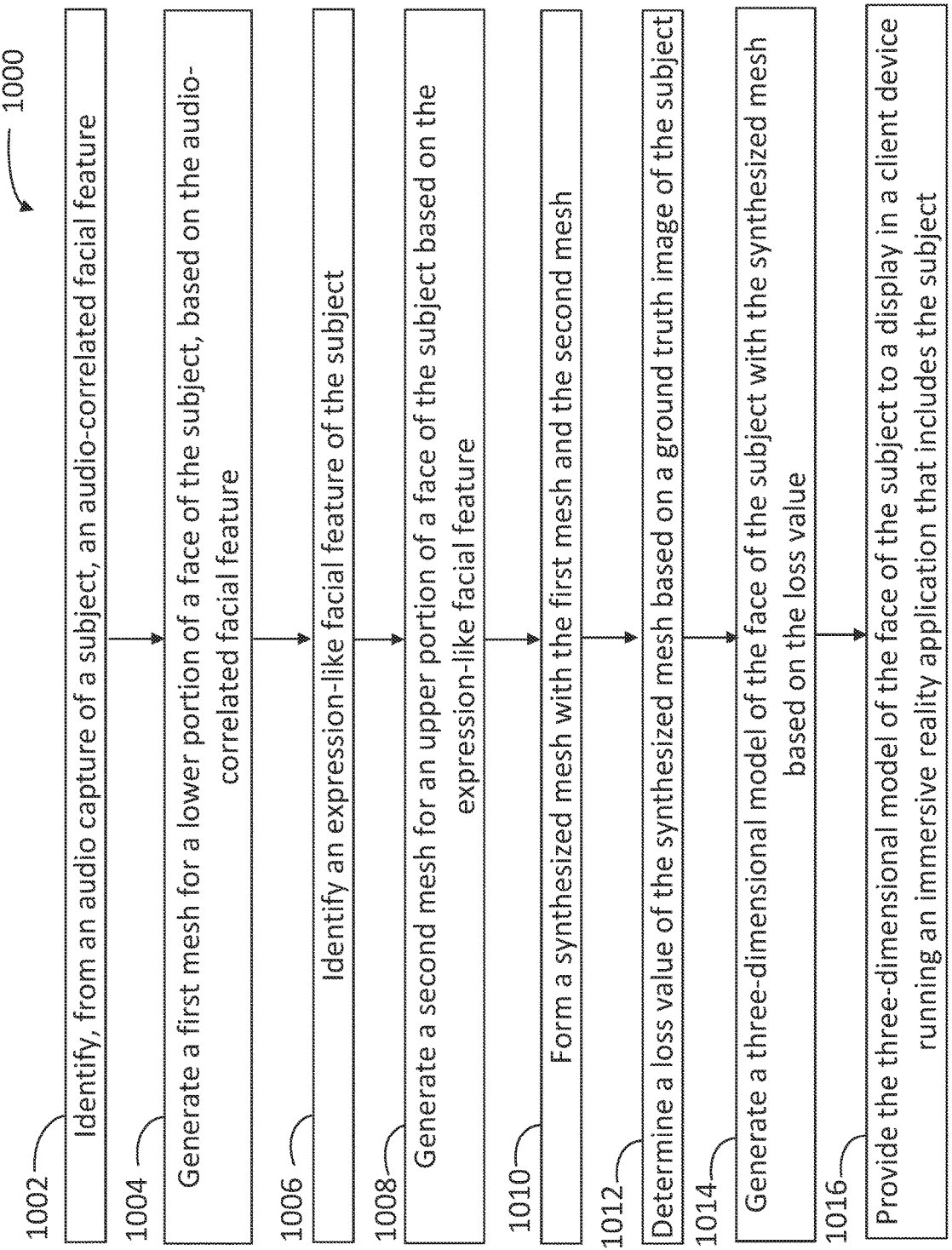
FIG. 10 is a flow chart illustrating steps in a method for using a three-dimensional model of a human face animated by speech in an immersive reality application, according to some embodiments.

FIG. 10 is a flow chart illustrating steps in a method 1000 for embedding a 3D speech animation model in a virtual reality environment, according to some embodiments. In some embodiments, method 1000 may be performed at least partially by a processor executing instructions in a client device or server as disclosed herein (cf. processors 212 and memories 220, client devices 110, and servers 130). In some embodiments, at least one or more of the steps in method 1000 may be performed by an application installed in a client device, or a 3D speech animation engine including a multimodal encoder and a multimodal decoder (e.g., application 222, 3D speech animation engine 232, multimodal encoder 240, and multimodal decoder 250). A user may interact with the application in the client device via input and output elements and a GUI, as disclosed herein (cf. input device 214, output device 216, and GUI 225). The multimodal encoder may include an audio encoder, a facial expression encoder, a convolution tool, and a synthetic encoder, as disclosed herein (e.g., audio encoder 242, facial expression encoder 244, convolution tool 246, and synthetic encoder 248). In some embodiments, methods consistent with the present disclosure may include at least one or more steps in method 1000 performed in a different order, simultaneously, quasi-simultaneously, or overlapping in time.

Step 1002 includes identifying, from an audio capture of a subject, an audio-correlated facial feature. In some embodiments, step 1002 further includes receiving the audio capture of the subject from a virtual reality headset. In some embodiments, step 1002 further includes identifying an intensity and a frequency of the audio capture from the subject and correlating an amplitude and a frequency of an audio waveform with a geometry of the lower portion of the face of the subject.

Step 1004 includes generating a first mesh for a lower portion of a face of the subject, based on the audio-correlated facial feature. In some embodiments, step 1004 further includes adding an eyeblink or an eyebrow motion of the subject.

Step 1006 includes identifying an expression-like facial feature of the subject. In some embodiments, step 1006 further includes stochastically selecting the expression-like facial feature based on a prior sampling of multiple subject's facial expressions. In some embodiments, step 1006 further includes correlating an upper facial feature with a speech feature from the audio capture of the subject. In some embodiments, step 1006 further includes using a stochastic sampling of multiple subject facial expressions collected during a training session of a second subject reading a text or in conversation.

Step 1008 includes generating a second mesh for an upper portion of the face of the subject based on the expression-like facial feature. In some embodiments, step 1008 further includes accessing a three-dimensional model of the face of the subject with a neutral expression.

Step 1010 includes forming a synthesized mesh with the first mesh and the second mesh. In some embodiments, step 1010 includes merging a lip shape in the first mesh into an eye closure in the second mesh continuously across the face of the subject.

Step 1012 includes determining a loss value of the synthesized mesh based on a ground truth image of the subject.

Step 1014 includes generating a three-dimensional model of the face of the subject with the synthesized mesh based on the loss value.

Step 1016 includes providing the three-dimensional model of the face of the subject to a display in a client device running an immersive reality application that includes the subject. In some embodiments, step 1016 includes receiving the audio capture of the subject together with an image capture of the face of the subject, and generating the second mesh includes using the image capture.

Figure 11:
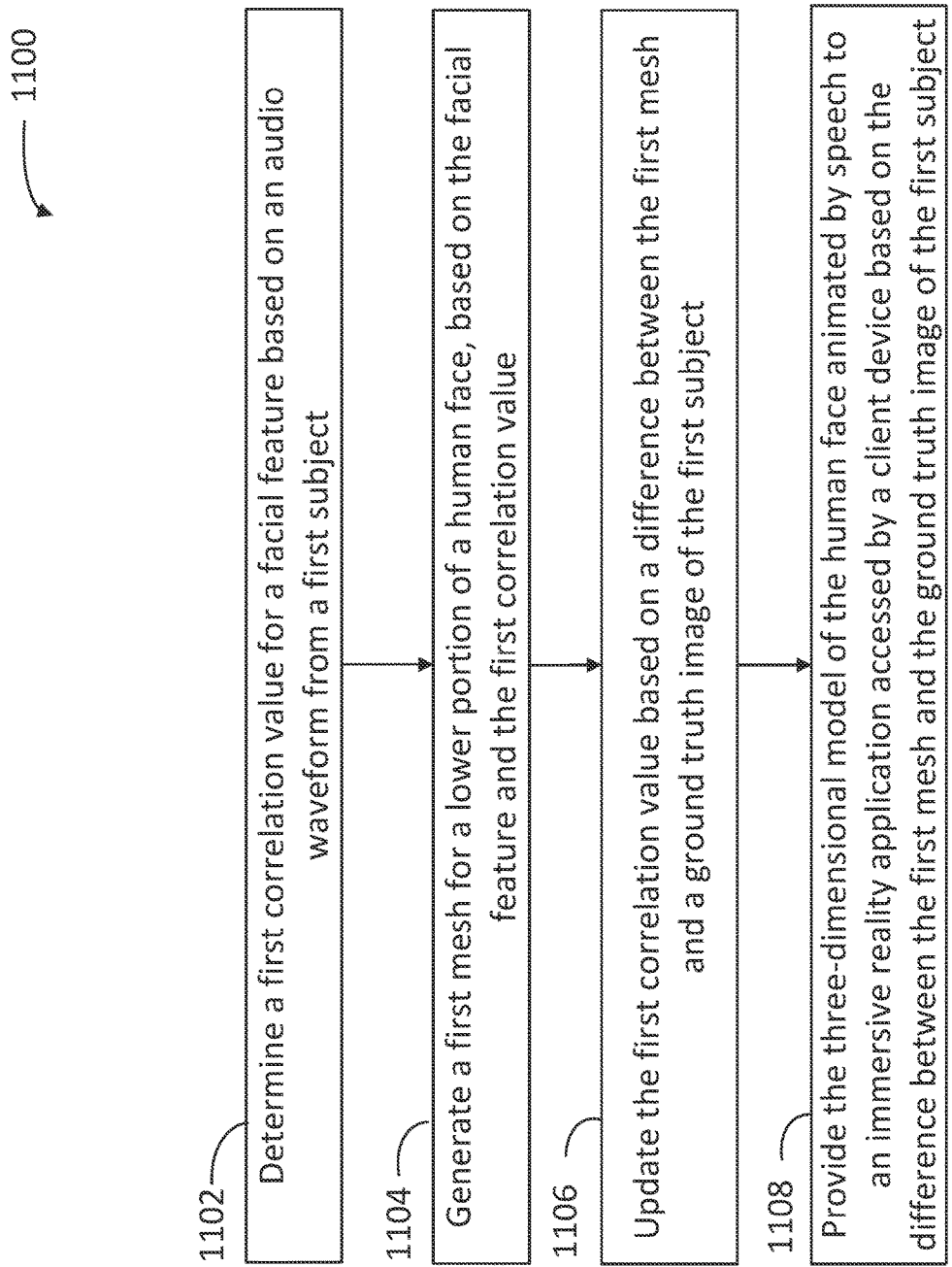
FIG. 11 is a flow chart illustrating steps in a method for generating a three-dimensional model of a human face animated by speech, according to some embodiments.

FIG. 11 is a flow chart illustrating steps in a method 1100 for training a 3D model to create real-time 3D speech animation of a subject, according to some embodiments. In some embodiments, method 1000 may be performed at least partially by a processor executing instructions in a client device or server as disclosed herein (cf. processors 212 and memories 220, client devices 110, and servers 130). In some embodiments, at least one or more of the steps in method 1100 may be performed by an application installed in a client device, or a 3D speech animation engine including a multimodal encoder and a multimodal decoder (e.g., application 222, 3D speech animation engine 232, multimodal encoder 240, and multimodal decoder 250). A user may interact with the application in the client device via input and output elements and a GUI, as disclosed herein (cf. input device 214, output device 216, and GUI 225). The multimodal encoder may include an audio encoder, a facial expression encoder, a convolution tool, and a synthetic encoder, as disclosed herein (e.g., audio encoder 242, facial expression encoder 244, convolution tool 246, and synthetic encoder 248). In some embodiments, methods consistent with the present disclosure may include at least one or more steps in method 1100 performed in a different order, simultaneously, quasi-simultaneously, or overlapping in time.

Step 1102 includes determining a first correlation value for a facial feature based on an audio waveform from a first subject. In some embodiments, step 1102 further includes determining a second correlation value for an upper facial feature. In some embodiments, step 1102 includes identifying the facial feature based on an intensity and a frequency of the audio waveform.

Step 1104 includes generating a first mesh for a lower portion of a human face, based on the facial feature and the first correlation value. In some embodiments, step 1104 further includes generating a second mesh for an upper portion of the human face based on the upper facial feature and the second correlation value and forming a synthesized mesh with the first mesh and the second mesh.

Step 1106 includes updating the first correlation value based on a difference between the first mesh and a ground truth image of the first subject.

Figure 12:
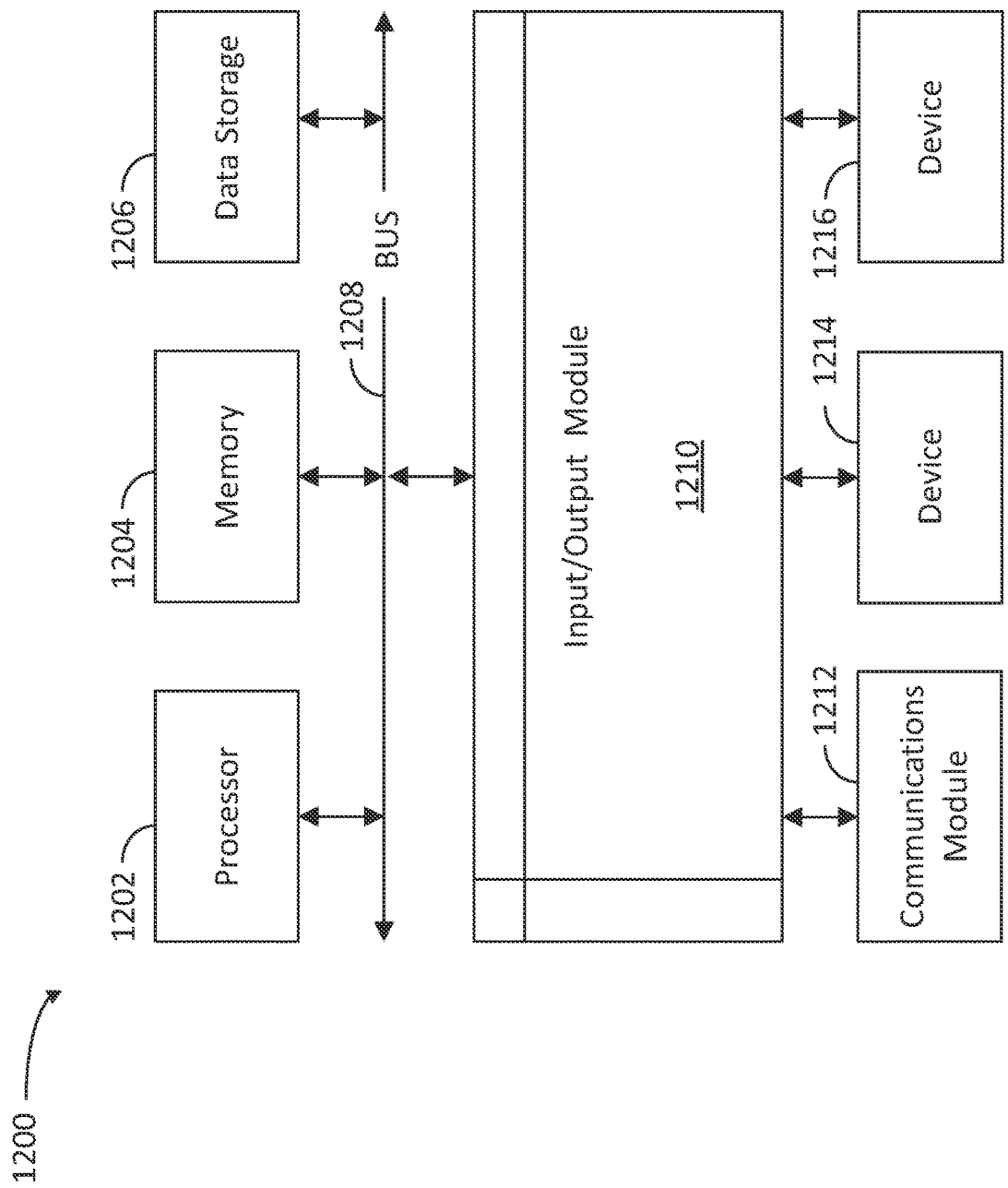
FIG. 12 is a block diagram illustrating an example computer system with which the client and server of FIGS. 1 and 2 and the methods of FIGS. 10-11 can be implemented.

Step 1108 includes providing the three-dimensional model of the human face animated by speech to an immersive reality application accessed by a client device based on the difference between the first mesh and the ground truth image of the first subject. In some embodiments, step 1108 further includes forming the three-dimensional model of the human face animated by speech with the synthesized mesh. In some embodiments, step 1108 includes determining a loss value of the first mesh based on a ground truth image of the first subject. In some embodiments, step 1108 includes updating the first correlation value for a facial feature based on an audio waveform from a second Hardware Overview FIG. 12 is a block diagram illustrating an exemplary computer system 1200 with which the client and server of FIGS. 1 and 2, and the methods of FIGS. 10 and 11 can be implemented. In certain aspects, the computer system 1200 may be implemented using hardware or a combination of software and hardware, either in a dedicated server, or integrated into another entity, or distributed across multiple entities.

Computer system 1200 (e.g., client 110 and server 130) includes a bus 1208 or other communication mechanism for communicating information, and a processor 1202 (e.g., processors 212) coupled with bus 1208 for processing information. By way of example, the computer system 1200 may be implemented with one or more processors 1202. Processor 1202 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1200 can include, in addition to hardware, code that creates an execution environment for the computer program in question, e.g., code that constitutes processor firmware, a protocol stack, a database management system, an operating system, or a combination of one or more of them stored in an included memory 1204 (e.g., memories 220), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 1208 for storing information and instructions to be executed by processor 1202. The processor 1202 and the memory 1204 can be supplemented by, or incorporated in, special purpose logic circuitry.

The instructions may be stored in the memory 1204 and implemented in one or more computer program products, e.g., one or more modules of computer program instructions encoded on a computer-readable medium for execution by, or to control the operation of, the computer system 1200, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1204 may also be used for storing temporary variable or other intermediate information during execution of instructions to be executed by processor 1202.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1200 further includes a data storage device 1206 such as a magnetic disk or optical disk, coupled to bus 1208 for storing information and instructions. Computer system 1200 may be coupled via input/output module 1210 to various devices. Input/output module 1210 can be any input/output module. Exemplary input/output modules 1210 include data ports such as USB ports. The input/output module 1210 is configured to connect to a communications module 1212. Exemplary communications modules 1212 (e.g., communications modules 218) include networking interface cards, such as Ethernet cards and modems. In certain aspects, input/output module 1210 is configured to connect to a plurality of devices, such as an input device 1214 (e.g., input device 214) and/or an output device 1216 (e.g., output device 216). Exemplary input devices 1214 include a keyboard and a pointing device, e.g., a mouse or a trackball, by which a user can provide input to the computer system 1200. Other kinds of input devices 1214 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 1216 include display devices, such as an LCD (liquid crystal display) monitor, for displaying information to the user.

According to one aspect of the present disclosure, the client 110 and server 130 can be implemented using a computer system 1200 in response to processor 1202 executing one or more sequences of one or more instructions contained in memory 1204. Such instructions may be read into memory 1204 from another machine-readable medium, such as data storage device 1206. Execution of the sequences of instructions contained in main memory 1204 causes processor 1202 to perform the process steps described herein. One or more processors in a multi-processing arrangement may also be employed to execute the sequences of instructions contained in memory 1204. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following tool topologies, including a bus network, a star network, a ring network, a mesh network, a star-bus network, tree or hierarchical network, or the like. The communications modules can be, for example, modems or Ethernet cards.

Computer system 1200 can include clients and servers. A client and server are generally remote from each other and typically interact through a communication network. The relationship of client and server arises by virtue of computer programs running on the respective computers and having a client-server relationship to each other. Computer system 1200 can be, for example, and without limitation, a desktop computer, laptop computer, or tablet computer. Computer system 1200 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 1202 for execution. Such a medium may take many forms, including, but not limited to, non-volatile media, volatile media, and transmission media. Non-volatile media include, for example, optical or magnetic disks, such as data storage device 1206. Volatile media include dynamic memory, such as memory 1204. Transmission media include coaxial cables, copper wire, and fiber optics, including the wires forming bus 1208. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is directly recited in the above description. No clause element is to be construed under the provisions of 35 U.S.C. § 112, sixth paragraph, unless the element is expressly recited using the phrase "means for" or, in the case of a method clause, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
identifying, from an audio capture of a subject, an audio-correlated facial feature;
generating a first mesh for a lower portion of a face of the subject, based on the audio-correlated facial feature;
identifying an expression-like facial feature of the subject;
generating a second mesh for an upper portion of the face of the subject based on the expression-like facial feature;
forming a synthesized mesh with the first mesh and the second mesh;
generating a three-dimensional model of the face of the subject with the synthesized mesh based on a ground truth image of the subject; and
providing the three-dimensional model of the face of the subject to a display in a client device running an immersive reality application that includes the subject.

2. The computer-implemented method of claim 1, further comprising receiving the audio capture of the subject from a virtual reality headset.

3. The computer-implemented method of claim 1, wherein identifying the audio-correlated facial feature comprises identifying an intensity and a frequency of the audio capture from the subject and correlating an amplitude and a frequency of an audio waveform with a geometry of the lower portion of the face of the subject.

4. The computer-implemented method of claim 1, wherein generating the first mesh comprises including an eyeblink or an eyebrow motion of the subject.

5. The computer-implemented method of claim 1, wherein identifying the expression-like facial feature of the subject comprises stochastically selecting the expression-like facial feature based on a prior sampling of multiple facial expressions of the subject.

6. The computer-implemented method of claim 1, wherein identifying the expression-like facial feature of the subject comprises correlating an upper facial feature with a speech feature from the audio capture of the subject.

7. The computer-implemented method of claim 1, wherein identifying the expression-like facial feature of the subject comprises using a stochastic sampling of multiple facial expressions collected during a training session of a second subject reading a text or in a conversation.

8. The computer-implemented method of claim 1, wherein generating the second mesh comprises accessing a three-dimensional model of the face of the subject with a neutral expression.

9. The computer-implemented method of claim 1, wherein forming the synthesized mesh comprises merging a lip shape in the first mesh into an eye closure in the second mesh continuously across the face of the subject.

10. The computer-implemented method of claim 1, further comprising receiving the audio capture of the subject together with an image capture of the face of the subject, and generating the second mesh comprises using the image capture.

11. A system, comprising:
one or more processors; and
a memory storing instructions which, when executed by the one or more processors, cause the system to:
identify, from an audio capture of a subject, an audio-correlated facial feature;
generate a first mesh for a lower portion of a face of the subject, based on the audio-correlated facial feature;
identify an expression-like facial feature of the subject;
generate a second mesh for an upper portion of the face of the subject based on the expression-like facial feature;
form a synthesized mesh with the first mesh and the second mesh;
generate a three-dimensional model of the face of the subject with the synthesized mesh based on a ground truth image of the subject; and
provide the three-dimensional model of the face of the subject to a display in a client device running an immersive reality application that includes the subject.

12. The system of claim 11, wherein the one or more processors further execute instructions to receive the audio capture of the subject from a virtual reality headset.

13. The system of claim 11, wherein to identify the expression-like facial feature of the subject the one or more processors execute instructions to stochastically select the expression-like facial feature based on a prior sampling of multiple facial expressions of the subject.

14. The system of claim 11, wherein to identify the expression-like facial feature of the subject the one or more processors execute instructions to correlate an upper facial feature with a speech feature from the audio capture of the subject.

15. The system of claim 11, wherein to identify the expression-like facial feature of the subject the one or more processors execute instructions to use a stochastic sampling of multiple facial expressions collected during a training session of a second subject reading a text or in a conversation.

16. A computer-implemented method, comprising:
determining a first correlation value for a facial feature based on an audio waveform from a first subject;
generating a plurality of meshes configured for different portions of a human face, based on the facial feature and at least the first correlation value;
updating the first correlation value based on a difference between at least one of the plurality of meshes and a ground truth image of the first subject; and
providing a three-dimensional model of the human face animated by speech to an immersive reality application accessed by a client device based on the difference between the least one of the plurality of meshes first mesh and the ground truth image of the first subject.

17. The computer-implemented method of claim 16, further comprising:
determining a second correlation value for an upper facial feature;
generating a mesh for an upper portion of the human face based on the upper facial feature and the second correlation value;
forming a synthesized mesh with the mesh; and
forming the three-dimensional model of the human face animated by speech with the synthesized mesh.

18. The computer-implemented method of claim 16, wherein determining the first correlation value for the facial feature comprises identifying the facial feature based on an intensity and a frequency of the audio waveform.

19. The computer-implemented method of claim 16, further comprising determining a loss value of the plurality of meshes based on the ground truth image of the first subject.

20. The computer-implemented method of claim 16, further comprising updating the first correlation value for the facial feature based on a second audio waveform from a second subject.

* * * * *